Figure 1:
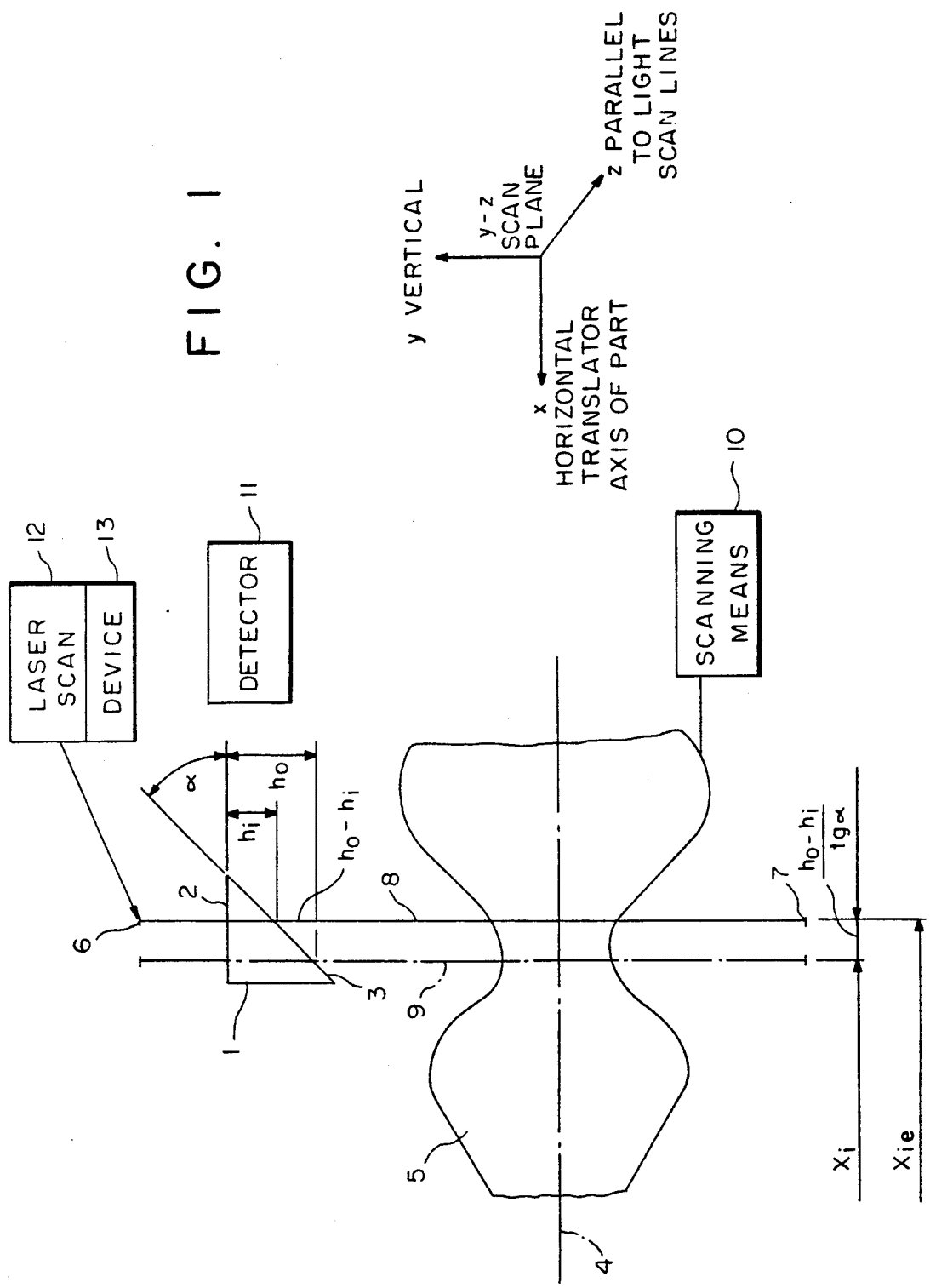

United States Patent [19]

Spizzamiglio

[11] Patent Number: 5,172,001
[45] Date of Patent: Dec. 15, 1992

[54] SYSTEM TO AUTOMATICALLY COMPENSATE THE TRANSVERSAL OSCILLATION OF THE SCANNING PLANE IN A LASER SCANNER USED FOR PROFILE MEASUREMENT USING REFERENCE ELEMENT

[75] Inventor: Antonio Spizzamiglio, Udine, Italy

[73] Assignee: Aeroel S.R.L., Pradamano, Italy

[21] Appl. No.: 471,338

[22] Filed: Jan. 29, 1990

[30] Foreign Application Priority Data

Jan. 30, 1989 [IT] Italy ................ 82801 A/89

[51] Int. Cl.[5] ............................................. G01B 11/24
[52] U.S. Cl. .................................. 250/560; 356/387
[58] Field of Search ............... 250/235, 560; 356/376, 356/386, 387

[56] References Cited

U.S. PATENT DOCUMENTS 4,758,729 7/1988 Monnin ............................... 250/560
4,794,262 12/1988 Sato et al. ............................ 356/376

Primary Examiner—David C. Nelms
Assistant Examiner—S. Allen
Attorney, Agent, or Firm—Browdy and Neimark

[57] ABSTRACT

System to automatically compensate the transversal oscillation of the scanning plane in a laser scanner used for profile measurement, by means of a special device.

The invention concerns a system which automatically compensates the transversal oscillation of the scanning plane in a laser scanner used for profile measurement, by means of a device consisting in a triangular plane (1) integral with the gage, or by a mask photoengraved onto a plane-parallel glass plate (which is the last element of the optical chain) or onto the main lens, or by a pin in the shape of a truncated cone integral with the gage, or by opto-electronic components of different kind, such as, for example, multiple-element photo-sensitive devices, analogical photo-sensitive position sensors, linear arrays of photodiodes, etc.

This system allows to determine the precise position of the scanning plane in comparison with the piece to be gaged, compensation achieved by means of one of the above-mentioned mechanical and opto-electronic devices.

6 Claims, 1 Drawing Sheet

SYSTEM TO AUTOMATICALLY COMPENSATE THE TRANSVERSAL OSCILLATION OF THE SCANNING PLANE IN A LASER SCANNER USED FOR PROFILE MEASUREMENT USING REFERENCE ELEMENT

BACKGROUND OF THE INVENTION

1. Field of the invention

The invention concerns a system devised in order to obtain an automatic compensation of the transversal oscillation in the scanning plane of a laser light profilometer through the application of a device allowing to decrease the time required to assess an unknown profile of any mechanical object or of any detail of the object itself.

2. The Prior Art

As is know, in order to assess the profile of an object it is necessary to measure the values of vertical coordinates (height, diameter, etc.) coming from the points in the profile corresponding to a certain number of values in the horizontal coordinates, obviously measured starting from certain points of origin suitably selected.

In the laser light profilometer as per our patent application registered in Italy with N. 82809 A/82 presented by the applicants of this patent and which represents the current state of the art, the measurement of vertical coordinates is carried out by means of a laser light gauge similar to the one described in the patent granted in Italy with N. 1212675 following application 82817 A/82 (submitted by the applicant). The measurement of the horizontal coordinate is executed by means of a linear optical transducer coupled by a faceplate slide with motor which shifts the piece perpendicularly to the scanning plane of the laser beam.

The values of vertical and horizontal coordinates, read by the profilometer, are memorized and properly processed as input data in an external computer and supply all features of the profile.

Thanks to this profilometer and to this instrumentation we can already obtain a speed, a precision and a flexibility in assessing the profile that are greater than those obtained by means of traditional tecniques; notwithstanding, the aforesaid profilometer does present some limitations attributable to possible imperfections in some optical-mechanical components possibly present in the gauge itself.

In particular, we are referring to the polygonal rotating mirror, whose faces contain some parallelism error vis-à-vis the rotation axis; we also refer to the unavoidable mechanical movement of the bearings supporting the rotation axis of the mirror.

Taking into account that the mirror is, as a rule, joined to a flywheel (since, in fact, the constant rotational speed of the mirror is connected with the precision of the measurement of the vertical coordinate of the profile), the mechanical movement of the bearings accordingly brings about a precession movement of the couple mirror-flywheel around the geometric axis of rotation of the bearings.

The above-mentioned causes (that is, the non-parallelism of the faces and the precession movement) lead to shifts in the scanning plane from one scanning cycle to the next of the laser beam; such displacements can be up to one hundredth of millimeter and involve a similar error in the measurement of horizontal coordinates. On the contrary, since measurements on the vertical axis are extremely precise, all errors on the horizontal axis lead to a deformed piece profile as reconstructed by the computer and. therefore, they spoil the eventual result, especially when the piece presents major variations of gradient, or when the edge of the piece is parallel or almost parallel to the scanning direction.

It is not easy task to limit such error acting directly on the relevant causes, and, besides involving considerable costs, this also spoils the potential of the instrument itself.

Up to now, in order to compensate for the imperfect parallelism of the polygonal mirror faces, only one of its faces was a reflecting face or, alternatively, a single faced mirror was resorted to; this, however, brought about a decreased scanning frequency and, therefore, increasing assessment times.

Another solution envisaged (described in the application for patent registered in Italy with N. 82809 A/83) was to utilize a mirror with faces that could be adjusted separately; this option however had a considerable manufacturing cost. In any case, even though we could imagine to have a perfect mirror at our disposal, the problem of bearing movement would be unsolved all the same.

SUMMARY OF THE INVENTION

The aim of this invention is then to automatically assess the actual position of the scanning plane in order to subsequently carry out the necessary adjustements to the horizontal coordinate measured by the linear transducer so as to reconstruct the real profile of the piece.

This aim is accomplished thanks to this invention, where the problems cited above are overcome by including a sample element joined to the laser light gauge positioned, for instance, so that one of its dimensions is perpendicular vis-à-vis the scanning plane and another is inclined vis-à-vis the same plane of a known angle.

The same aim can of course be reached by means of other solutions, for instance by a triangular mask printed down on to the plane-parallel glass plate that is the last element of the optical chain, or on to the main lens. Another solution can be: a sample truncated-cone shaped plug joined to the laser light gauge and positioned preferably with its axis perpendicular to the scanning plane and with an opening angle at vertex or with a taper ratio that must be both known.

Another solution still can be represented by different optical electronic sensors, such as for instance elements that are photosensitive to one or more quadrants, or by analog positioning sensors, photodiode lines etc., placed inside or outside the laser gauge before of after the main lens. The device is designed in such a way that it produces a distinguishable variation in the electrical signal into the profilometer, through scanning for the measurement of the laser beam, when the scanning plane itself comes out of its preset reference positioning. Starting from the amount of such variation and relevant direction, it is subsequently possible to, by means of a preset law that changes depending upon the kind of device, obtain the value and the displacement direction of the scanning plane versus the basic reference position of the instrument.

The advantages obtained through this invention are, basically, the solution of measurement problems cited above, in a much more economical way than is the case with an action targetted to partially or totally limiting the causes of the displacement of the scanning plane.

With this invention the precision of the end result is kept intact; better still, improved and decreased times for measurement assessment are recorded.

The invention can be best understood following the description of a practical example, illustrated in the drawings attached herewith, in which the operational principle of the invention itself is thoroughly explained.

It is thus possible, through the invention itself, to carry out the correction of the value of the horizontal coordinate already supplied by the linear transducer, thanks to the application of the aforesaid principle, implemented by means of a plaque (for instance, a triangular one).

DESCRIPTION OF THE DRAWING AND OF THE PREFERRED EMBODIMENT

FIG. 1 in fact shows a schematic positioning for the corrective device already known from the geometrical viewpoint vis-à-vis the vertical scanning plane and the horizontal feed movement axis of the piece in order to interfere with the laser beam, thus obtaining the scanning elements.

The device, in this case, has an essential component, i.e., a triangular plate (1) joined to the laser light gauge and positioned so that it can be contained within a vertical plane perpendicular to the scanning plane and with the side (2) perpendicular to the scanning plane itself; accordingly, the side (3) of the triangular plate (1) has an inclination equal to angle $\alpha$ vis-à-vis the translation axis (4) of the piece (5).

The triangular plate (1) is contained within the field of measurement of the laser light gauge, that is, its vertical dimensions are contained within the upper limit (6) and the lower limit (7) of the trace (8) of the scanning plane explored by the laser beam.

The profilometer resorted to in all cases is not different from the one already described in the patent application no. 82809 A/83 except for the following difference: the laser light gauge after application of this invention can be equipped with a polygonal rotating mirror, where all faces have been made reflective.

This is possible, since parallelism errors of the faces versus the rotation axis, which imply shifts in the scanning plane, are detected by applying this device and can therefore be observed and adjusted. After saying this, the measure of the transversal casual shift of the scanning plane is detected by the device—object of the present method—by following these calculation criteria:

during the first scanning phase of the laser beam the scanning plane has a certain basic positioning versus the triangular plate (1) (FIG. 1) as indicated by the trace (9) of the scanning plane itself. During this first stage of scanning, where a correspondence is found with a horizontal coordinate x° to be taken as the initial reference value, the height ho of the plate and, of course, the value of the vertical coordinate of the profile.

During a general scanning phase, on the contrary, the piece is translated up to a certain value of coordinate xi starting from the initial coordinate xo measured by the linear tranducer; here the scanning plane will be positioned on a trace (8) that does not necessarily coincide with the trace (9) of the initial scanning (FIG. 1). In this new scanning height hi of the plate and the value of the vertical coordinate of the profile are always measured; but this coordinate cannot have the same value as coordinate xi, already recorder by the linear transducer.

Such value must be corrected up to a quantity that, for this very device, is equal to:

$$\frac{h0 - hi}{tg\alpha} \qquad 1)$$

In particular, if $\alpha = 45°$ is chosen, the necessary correction will simply be 2) ho−hi. Obviously, the device, by means of suitable computerized processing, supplies the relevant electrical signals and automatically corrects the value of the horizontal coordinate, thus supplying the correct result:

$$xie = xi + \frac{h0 - hi}{tg\alpha} \text{ or} \qquad 3)$$

$$xie = xi + (h0 - hi) \qquad 4)$$

in the specific case where $\alpha = 45°$

It must be stressed that all the sample devices utilized fully or in part can be resorted to simultaneously in order to also determine the scanning speed of the laser beam, thus allowing to calibrate the laser light guage.

What is claimed is:

1. A method for automatic correction of measurements of an object made by a laser profilometer when there are oscillations of a gauge scanning plane which cause error in measurements of a longitudinal work piece position, comprising:
    a) placing a reference element having a known geometrical shape, fixed to a gauge body, across said laser gauge scanning plane;
    b) measuring said reference element and said object in a single scan of said profilometer;
    c) effecting a second measuring of said reference element and said object in a second single scan of said profilometer;
    d) determining measuring error by multiplying the difference between said first and second reference element measurements by a known function which describes the reference element geometrical profile;
    e) adding scanning plane position error to a longitudinal coordinate read by a linear encoder; and
    f) determining corrected object profile measurements despite said scanning plane position error.

2. The method in accordance with claim 1, wherein the first measurement is made at a different time than said second measurement.

3. A method in accordance with claim 1, wherein the scanning plane oscillations parallel to the plane, mainly produced by the scanning motor shaft runout and by the parallelism error between the polygonal mirror different facets and the rotational axis, are automatically compensated by measuring the height (dimension in the scanning direction) of said reference element.

4. A method according to claim 1, wherein said reference element has a geometrically known shape.

5. The method according to claim 1, wherein said reference element has a triangular shape.

6. A method in accordance with claim 5, wherein one side triangle is in a plane perpendicular to the scanning plane of the profilometer and a second side is tilted with respect to the scanning plane of a known angle.

* * * * *